Sept. 1, 1931.    S. T. WHARTON    1,821,735
BRAKE FOR FISHING REELS
Filed July 25, 1929
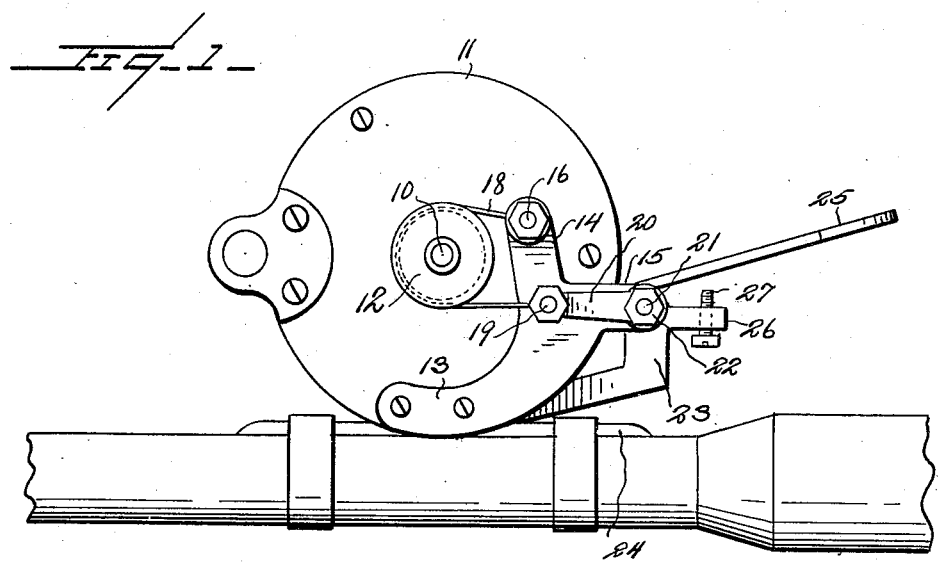
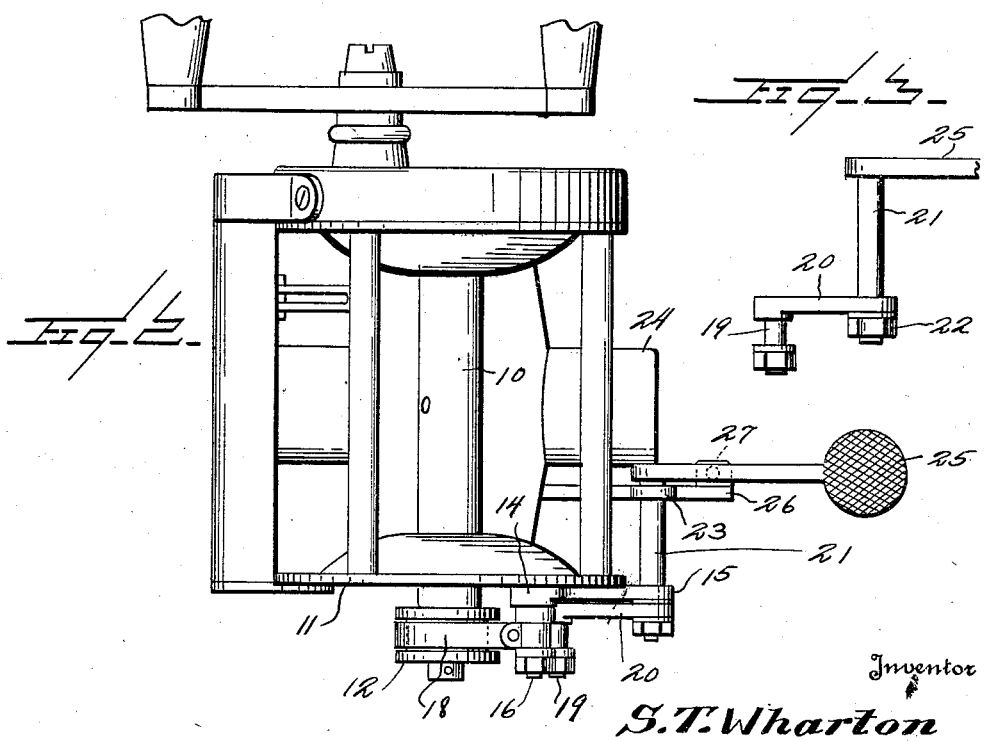
Inventor
S. T. Wharton
By Watson E. Coleman
Attorney Patented Sept. 1, 1931

1,821,735

UNITED STATES PATENT OFFICE

SELVIN T. WHARTON, OF COLUMBUS, MISSISSIPPI, ASSIGNOR OF ONE-HALF TO ELBERT S. JONES, OF COLUMBUS, MISSISSIPPI

BRAKE FOR FISHING REELS

Application filed July 25, 1929. Serial No. 380,999.

This invention relates to fishing reels and particularly to brakes therefor.

The general object of this invention is to provide a very simple, readily operated and effective braking means for fishing reels which will do away with the necessity of attempting to brake the line by pressing against the line with the finger or thumb which leads to blistered and cut thumbs.

A further object is to provide a brake which is at all times readily controlled and which will exert any desired amount of frictional resistance on the reel, and further to provide a brake which will permit the line to be cast to any desired extent, but which may be immediately operated to stop the paying out of the line.

Another object is to provide means for preventing the brake if desired from locking the reel when the brake is actuated, thus preventing any chance of the fish breaking the line.

Other objects will appear in the course of the following description.

My invention is illustrated in the accompanying drawings, wherein:—

Figure 1 is a side elevation of a fishing rod and reel with my brake applied thereto;

Figure 2 is a top plan view of the reel and brake;

Figure 3 is a detail view of the brake actuating arm and shaft.

Referring to the drawings, it will be seen that my device comprises the usual fishing reel, the internal construction of which is not necessary to illustrate. This fishing reel has the usual rotatable shaft 10 and beyond one end the disk or plate 11 of the frame which shaft carries upon it a brake wheel 12.

Mounted upon the plate 11 of the frame and extending concentrically to the shaft 10 is a metal supporting strip 13 attached to the plate 10 by screws, rivets or any other suitable means. This strip is formed with the upwardly and inwardly extending ear 14 and with the rearwardly extending ear 15 which is disposed nearly at right angles to the lug or ear 14.

Projecting outward from the extremity of the metallic strip or bracket 13 is a post 16 having the form of a stud bolt to which one end of a brake band 18 is attached, this brake band passing around the friction wheel 12. The other end of this band is attached to a post having the form of a stud bolt and designated 19 projecting laterally from an arm 20 which is mounted upon a rock shaft 21, the arm being held in place on the shaft by means of the nut 22.

The shaft 21 is supported at one end in the lug 14 and at its other end in a bracket 23, this bracket extending beneath the usual attaching plate 24 of the reel and projecting rearward to any desired distance, it being formed with an upwardly projecting lug through which the shaft passes. Mounted upon the inner end of the shaft 21 just inward of the supporting bracket 23 is a thumb piece 25. It will be obvious now that when this thumb piece 25 is depressed, the arm 20 will be raised, thus tightening the brake band 18 around the drum or wheel 12. When pressure on the thumb piece is released, the brake band will be relaxed, the brake band being resilient, and the two arms of the brake band being urged to an open position by their resilience.

Preferably the bracket 23 is provided with the rearwardly projecting lug 26 through which passes the limiting screw 27. When this screw is turned fully upward, it permits only a relatively slight depression of the thumb piece 25. When the screw is turned fully downward, it permits the complete compression of the thumb piece 25. Thus it will be seen that by adjusting the screw 27, the amount of pressure which can be exerted upon the brake drum 12 may be controlled. It will be seen that a brake of this character is extremely simple, may be readily applied to practically all makes of fishing reels, that it is thoroughly effective and that by its means, in bait casting, the bait can be stopped wherever the fisherman desires. At the same time, means are provided whereby the amount of pressure exerted by the brake on the brake drum may be controlled so as to prevent the reel from becoming locked as if a reel is locked strong and fast, there is a likelihood of the fish breaking the line.

I claim:—

1. In a fishing reel, a reel shaft having a brake drum, a brake band embracing the drum and fixedly supported at one end, a bracket mounted upon the reel, a shaft carried by the bracket and having an arm to which the other end of the brake band is connected, the shaft having a thumb piece whereby it may be depressed and the brake band tightened and adjustable means for limiting the depression of the thumb piece and thereby controlling the tightness of the brake band.

2. An attachment for fishing reels comprising a drum adapted to be disposed upon the shaft of the fishing reel, a supporting strip having apertures whereby it may be engaged with the frame of the fishing reel concentrically to the drum, said strip having an outwardly projecting post, a resilient band attached to one end of said post and partially surrounding the drum, a bracket member, a shaft passing through said bracket member and through said strip and having an arm provided with a post to which the other end of the brake band is attached, a thumb piece projecting outward from said shaft, and a limiting screw mounted upon said bracket beneath the thumb piece and adjustable to limit the downward movement of the thumb piece and the consequent tightening of the brake band.

In testimony whereof I hereunto affix my signature.

SELVIN T. WHARTON.